(12) United States Patent
Smith et al.

(10) Patent No.: US 10,725,303 B2
(45) Date of Patent: Jul. 28, 2020

(54) WIDE ANGLE DISPLAY

(71) Applicant: Sharp Kabushiki Kaisha, Osaka (JP)

(72) Inventors: William Smith, Oxford (GB); David James Montgomery, Oxford (GB)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 16/223,738

(22) Filed: Dec. 18, 2018

(65) Prior Publication Data
US 2020/0195912 A1 Jun. 18, 2020

(51) Int. Cl.
*G02B 27/01* (2006.01)
*H04N 13/332* (2018.01)

(52) U.S. Cl.
CPC ..... *G02B 27/0172* (2013.01); *G02B 27/0176* (2013.01); *H04N 13/332* (2018.05)

(58) Field of Classification Search
CPC .............. G02B 27/017; G02B 27/0172; G02B 27/0176; G02B 2027/0174; G02B 2027/0178; H04N 13/332–344
See application file for complete search history.

(56) References Cited

U.S. PATENT DOCUMENTS

| | | | |
|---|---|---|---|
| 5,754,344 A | 5/1998 | Fujiyama | |
| 9,769,465 B2 | 9/2017 | Seo et al. | |
| 9,798,153 B2* | 10/2017 | Ide | G02B 3/0056 |
| 2004/0227703 A1* | 11/2004 | Lamvik | G02B 27/0172 |
| | | | 345/76 |
| 2010/0039796 A1* | 2/2010 | Mukawa | G02B 27/0081 |
| | | | 362/97.1 |
| 2014/0266990 A1* | 9/2014 | Makino | G02B 27/0172 |
| | | | 345/8 |
| 2015/0338660 A1* | 11/2015 | Mukawa | G02B 5/30 |
| | | | 359/13 |
| 2017/0115489 A1 | 4/2017 | Hu et al. | |
| 2017/0212360 A1 | 7/2017 | Yang et al. | |
| 2017/0347089 A1 | 11/2017 | Peterson | |
| 2017/0371162 A1* | 12/2017 | Makino | G02B 27/0172 |
| 2019/0113755 A1* | 4/2019 | Komatsu | G02B 27/0172 |

FOREIGN PATENT DOCUMENTS

| | | |
|---|---|---|
| EP | 2564259 B1 | 1/2015 |
| JP | H10206786 | 8/1998 |

* cited by examiner

*Primary Examiner* — Gene W Lee
(74) *Attorney, Agent, or Firm* — Renner, Otto, Boisselle & Sklar, LLP

(57) ABSTRACT

An enhanced panoramic HMD that and related method of displaying an image employs an improved configuration of optical elements to achieve wider field of view as compared to conventional configurations. An HMD type display device includes a first optical element, coupled to the display device, configured to direct a central set of rays and a peripheral set of rays; a second optical element, coupled to the first optical element, configured to direct the central set of rays at a central image point; and a third optical component configured to direct the peripheral set of rays to a peripheral image point. The first optical element may include a microlens array wherein the microlens array comprises a plurality of individual microlenses; the second optical component may include a collimating lens; and the third optical component may include a mirror configured to reflect the peripheral set of rays to the peripheral image point.

19 Claims, 9 Drawing Sheets

WIDE ANGLE DISPLAY

TECHNICAL FIELD

The present invention relates to display devices, and more specifically to display devices that refract a portion of the rays from a single screen to create a panoramic field of view (FOV) in head mounted display devices (HMDs).

BACKGROUND ART

Conventional HMDs use a single screen that is visible to both eyes of a user. A conventional HMD can be used to display a virtual world to a user. Single screen HMDs limit the FOV of a user to around 110°. Attempts to increase the immersivity experienced by a user by providing a FOV over 180° have been large and expensive. The increase in size and expense of wider FOV HMDs arises partly because the optical components are often larger or more numerous. As a result, size and cost deter the adoption and regular usage of panoramic HMDs, leaving users limited to a virtual world where they can see far less than their eyes can see.

Several conventional approaches have been described for HMDs that provide a narrow FOV using a single screen visible to both eyes of a user. In one approach, US 2017/0212360 (Yang et al.) describes a large, single lens, a pair of polarizers, and a pair of prisms that can allow both eyes to see the same part of a screen displaying two polarized images. In another example, U.S. Pat. No. 9,769,465 (Seo et al.) describes an HMD design in which a curved autostereoscopic screen is viewed by both eyes through a large, single lens. In yet another approach, U.S. Pat. No. 5,754,344 (Fujiyama) describes an autostereoscopic screen, placed near the forehead of a user that can be seen by both eyes when the light is reflected off a large concave mirror. In another approach, JP 10206786A (Kanayama) describes a system with two concave mirrors and two flat half silvered mirrors in the optical paths. US 2017/0347089 (C. Peterson) describes the general case of using an autostereoscopic screen in a virtual reality or augmented reality system.

Conventional approaches to provide a panoramic FOV over 110° increase the number, size, and complexity of optical components and screens. In some examples, two or more screens may be used instead of one. EP 2564259B1 (Cheng et al.) describes an HMD with tiled TIR prisms that may be used with several micro-displays to provide a wide FOV. In other examples, lenses are widened, stacked or fused. US 2017/0115489 (Hu et al.) describes a system in which one curved screen and two fused lenses are needed for each eye to provide a wide FOV. The increase in the number of lenses and screens in conventional HMDs to increase the FOV do not necessarily increase the weight. But, at a minimum, appear larger and reduce their appeal to HMD users. Accordingly, improved systems and methods of providing a panoramic FOV are needed in the art.

SUMMARY OF INVENTION

The present invention provides designs for a panoramic HMD with a panoramic FOV, and in particular above 180° in exemplary embodiments. The designs described here do not require any components to be scaled up, but instead use a single moderately sized screen for the central and peripheral FOV of both eyes. As in a conventional HMD, some rays leave the screen at an approximately perpendicular angle, pass through one or more lenses and enter the user's eyes and are focussed onto the retina over a range corresponding to the center of vision. A portion of the light rays are refracted by microlenses on the surface of the screen and thus are directed along a different path. The refracted light rays are focussed by a mirror and/or lenses until they arrive at the peripheral vision part of the user's retina.

This approach has a number of advantages over conventional configurations. One screen can be used, or two small screens can be used near each other. Novel optical arrangements in which light rays leave the screen at an acute angle can be used. The microlenses can be designed to reduce the appearance of screen door effect. In addition, the microlens array can be spaced in a manner that yields a higher angular resolution in the center of the user's vision than the periphery, thus more closely matching the resolution of the eye.

An aspect of the invention, therefore, is an enhanced panoramic HMD that employs an improved configuration of optical elements to achieve wider field of view as compared to conventional configurations. In exemplary embodiments, a panoramic display device includes a first optical element, coupled to the display device, configured to direct a central set of rays and a peripheral set of rays; a second optical element, coupled to the first optical element, configured to direct the central set of rays at a central image point; and a third optical component configured to direct the peripheral set of rays to a peripheral image point. The first optical element may include a microlens array wherein the microlens array comprises a plurality of individual microlenses; the second optical component may include a collimating lens; and the third optical component may include a mirror configured to reflect the peripheral set of rays to the peripheral image point.

Another aspect of the invention is a method of displaying an image that can be performed using the enhanced panoramic HMD. In exemplary embodiments, the method includes the steps of: receiving an image represented by a plurality of image pixels; determining a central set of display pixels associated with a central set of rays; determining a peripheral set of display pixels associated with a peripheral set of rays; determining a first set of image pixels from the plurality of image pixels corresponding to the central set of display pixels; determining a second set of image pixels from the plurality of image pixels corresponding to the peripheral set of display pixels; and generating instructions to arrange the first set of image pixels on the central set of display pixels and the second set of image pixels on the peripheral set of display pixels.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF EMBODIMENTS

Embodiments of the present invention will now be described with reference to the drawings, wherein like reference numerals are used to refer to like elements throughout. It will be understood that the figures are not necessarily to scale.

Figure 1:
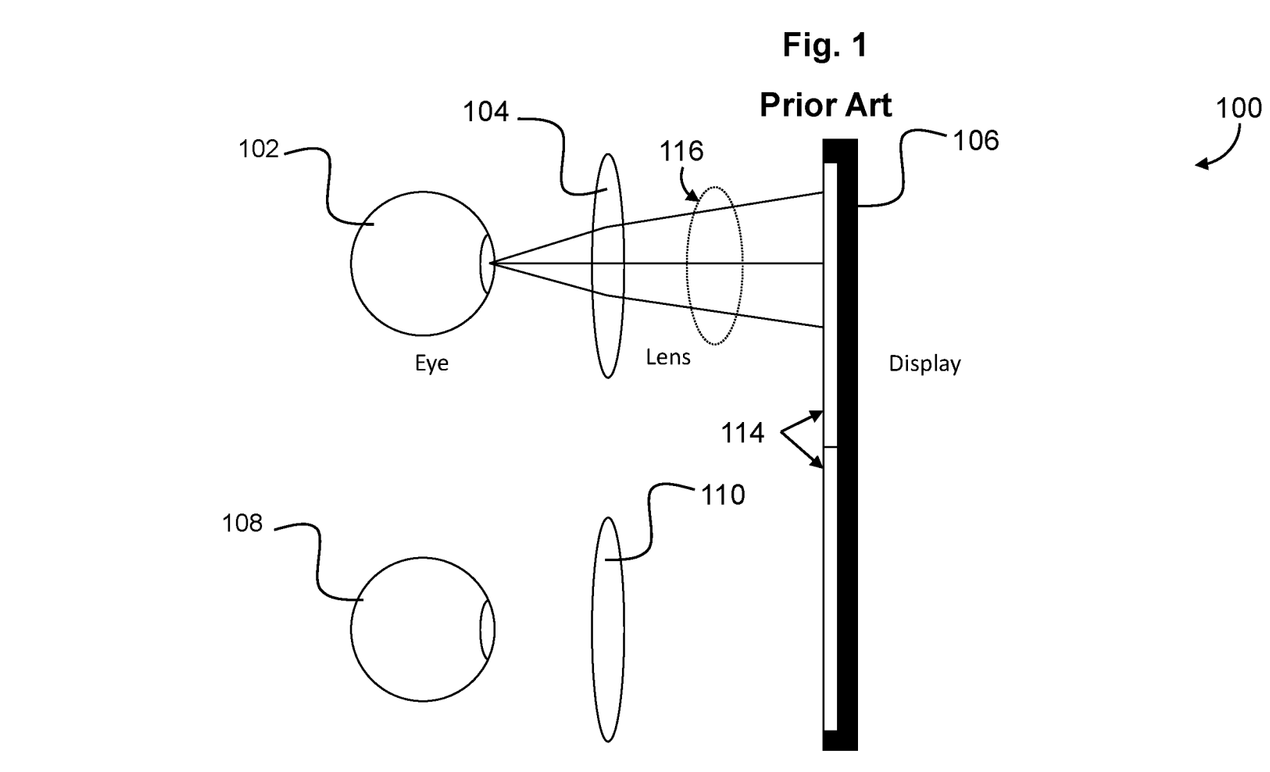
FIG. 1 is a schematic drawing depicting a display arrangement in a conventional HMD.

The present invention relates to a panoramic display that can improve the field of view in HMDs. FIG. 1 is a schematic drawing depicting a display arrangement in a conventional HMD 100. The conventional HMD 100 can include a display 106, a first lens 104 associated with a first eye 102 of a user, and a second lens 110 associated with a second eye 108 of the user. The display 106 can show two images 114 side by side. The light 116 from the two images can be collimated by the lenses to allow the eyes to focus at a comfortable distance. The conventional HMD 100 limits the FOV associated with the eyes of a user to approximately 110°. Humans have approximately a 210° horizontal FOV, and the limited FOV in conventional HMDs decreases the immersivity and realism of the experience of a user. Systems and methods are needed to improve the field of view in HMDs.

Figure 2:
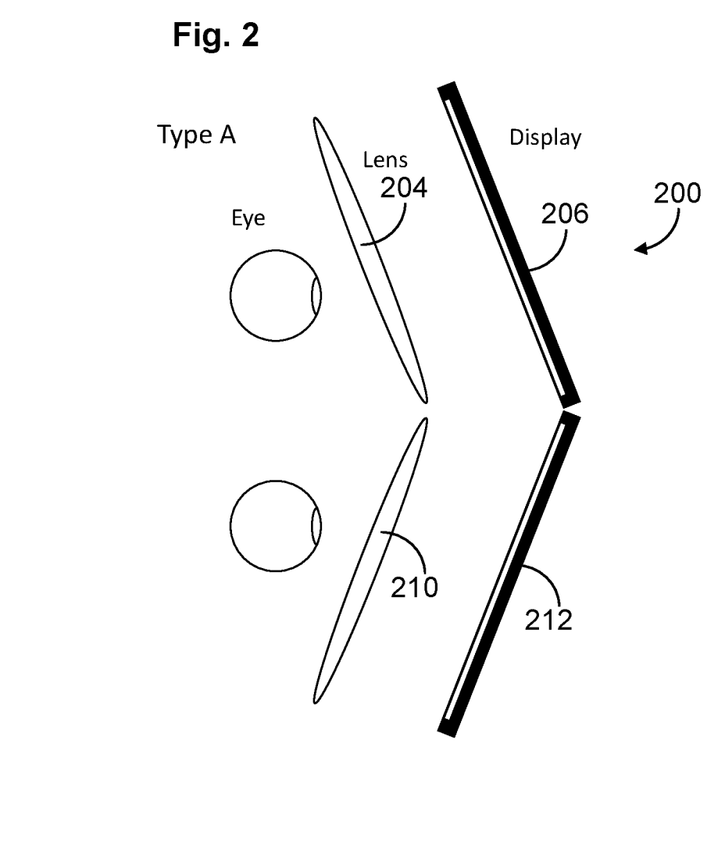
FIG. 2 is a schematic drawing depicting a first conventional technique to increase the field of view in an HMD.

FIG. 2 is a schematic drawing depicting a first conventional technique to increase the field of view in an HMD 200. Conventional techniques to increase the FOV shown in FIG. 2 include increasing the size of the optical components and increasing the number of displays. HMD 200 includes a larger first lens 204 and a larger second lens 210. The larger lenses increase the size and weight of the HMD 200 and increase optical aberrations. To reduce aberrations, the focal length can be increased to accommodate the larger lens size and maintain a constant F-number. As a result, the increase in focal length will increase the size of the HMD and reduce the appeal of the device to a user.

Figure 3:
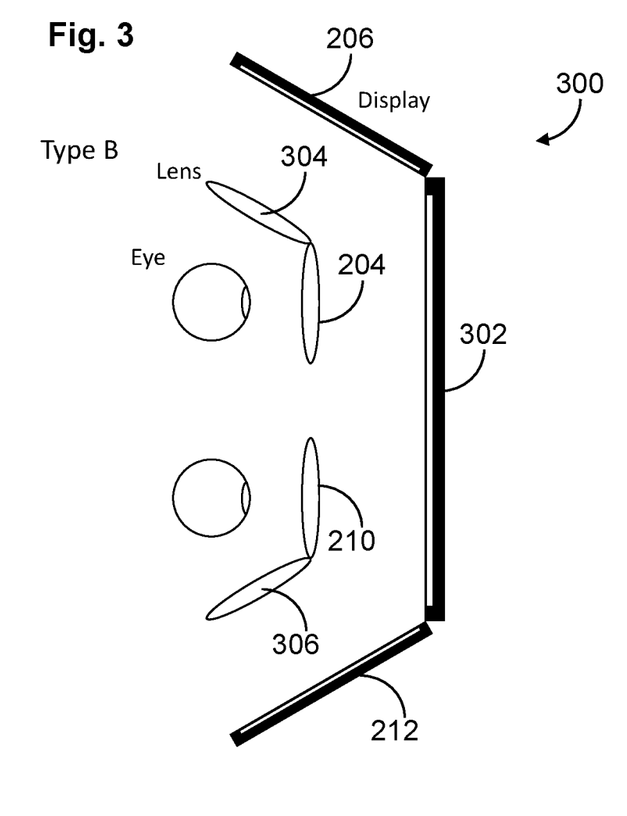
FIG. 3 is a schematic drawing depicting a second conventional technique to increase the field of view in an HMD.

In addition to increased lens size, the HMD 200 may include a first display 206 and a second display 212. Both the screens and lenses can be tilted to increase the total FOV. The number, size, and position of additional screens may vary, but the approach leads to increased size, complexity, and cost over a single screen design. FIG. 3 is a schematic drawing depicting a second conventional technique to increase the field of view in an HMD 300. The conventional HMD 300 uses a third screen 302, a third lens 304, and a fourth lens 306 to increase the field of view. Again, the increased number of conventional components leads to increased size, complexity, and cost over a single screen design.

Accordingly, there is a need in the art for improved systems and methods to increase the FOV in HMDs. The embodiments described herein use a single moderately sized screen for the central and peripheral FOV of both eyes. As in a conventional HMD, a central set of rays leaves the screen at an approximately perpendicular angle, passes through one or more optical elements, such as lenses, and enters the eyes of a user. The central set of rays is focused onto the retina over a range corresponding to the center of vision of a user. A second set of rays, for example, a peripheral set of rays, is refracted by a second optical element, such as a plurality of microlenses on the surface of the screen. The peripheral set of rays can take a different optical path from the optical path of the central set of rays. The peripheral set of rays can be focused by another optical element such as a mirror and/or lenses until they arrive at the peripheral vision part of the retina of a user.

This approach has several advantages. For example, a microlens array can be spaced in a manner that yields a higher angular resolution in the center of the vision of a user than in the periphery, thus more closely matching the resolution of the eye. In some embodiments, one or more microlens arrays can be used with one screen or two small screens positioned near each other. Furthermore, one or more microlenses can be designed to reduce the appearance of the "screen door effect" (referring to an image having a grid appearance similar to a screen door).

Figure 4:
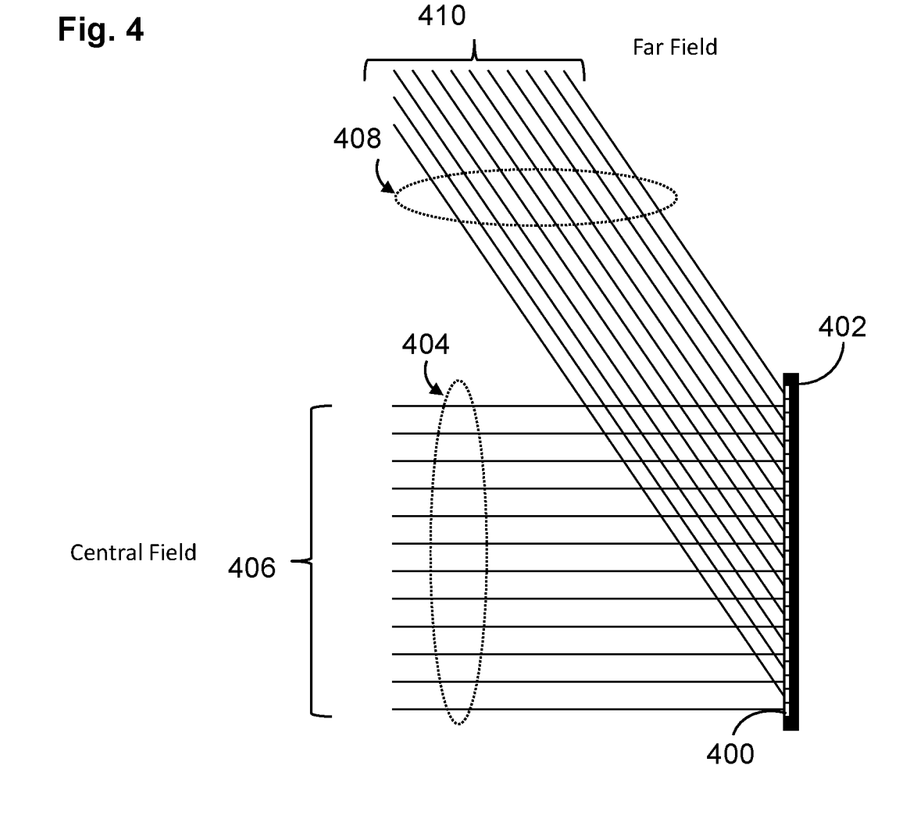
FIG. 4 is a cross-sectional drawing depicting a microlens array coupled to a display device according to embodiments of the present invention.

FIG. 4 is a cross-sectional drawing depicting a microlens array 400 coupled to a display device 402 according to embodiments of the present invention. Embodiments of the present invention can form a panoramic display by using a single display for a central field of view and a peripheral field of view. Microlens array 400 can be optically coupled to the display device 402. In some embodiments, the microlens array 400 can direct a central set of rays 404 in a first direction to form a central field 406, and the microlens array 400 can direct a peripheral set of rays 408 in a second direction to form a far field 410. When a viewer is positioned at the central field 406, the viewer sees pixels associated with the central set of rays 404. In some embodiments, microlens array 400 can direct light from half the pixels to the central set of rays 404. When the viewer is positioned at the far field 410, the viewer sees pixels associated with the peripheral set of rays 408. In some embodiments, microlens array 400 can direct light from half the pixels to the peripheral set of rays 408. The microlens array 400 can be designed and positioned relative to display device 402 to reduce light emission in unwanted directions.

Figure 5:
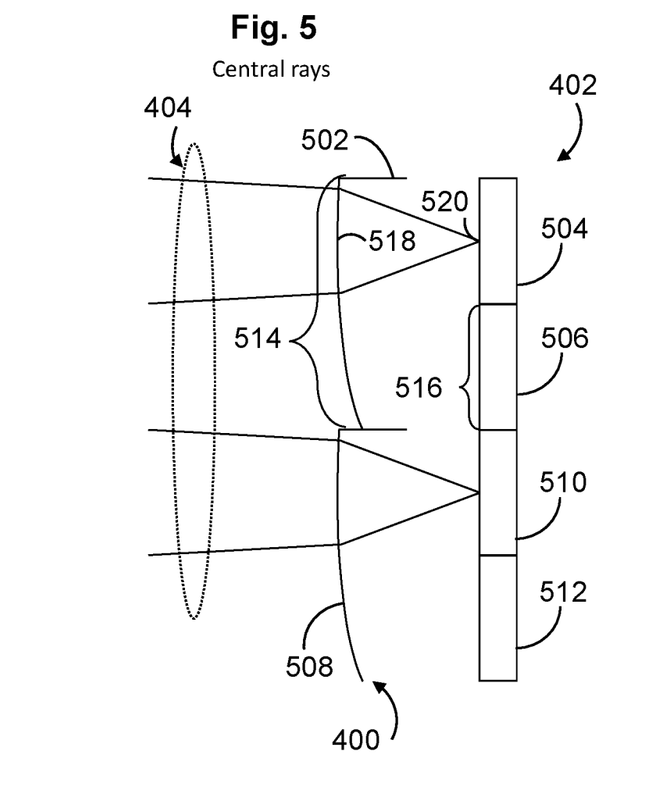
FIG. 5 is a cross-sectional drawing depicting microlenses directing central rays from pixels of a display device according to embodiments of the present invention.

FIG. 5 is a cross-sectional drawing depicting microlenses directing central rays from pixels of a display device according to embodiments of the present invention. FIG. 5 shows a first microlens 502 coupled to a first pixel 504 and a second pixel 506. A second microlens 508 is also shown coupled to a third pixel 510 and a fourth pixel 512. The microlenses shown in FIG. 5 are part of a larger microlens array such as microlens array 400 shown in FIG. 4. The pixels shown in FIG. 5 are part of a larger display such as display device 402. In some embodiments, the pixels can be components of a light-emitting display device such as for example an organic light-emitting diode, a micro light-emitting diode (LED), or a quantum dot LED. The microlenses may be lenticular or with square or rectangular apertures and the like. The width 514 of the microlens aperture can be greater than the pixel width 516. In some embodiments, the width 514 of the microlens aperture can be twice the pixel width 516.

In some embodiments, to form the central set of rays 404, the optical center 518 of the first microlens 502 can be at the same height as the center 520 of the first pixel 504. The positioning of the optical center 518 at the same height as the center 520 of the first pixel 504 can cause the light from the first pixel 504 to be collimated and directed perpendicular to the display with the central set of rays 404. In some embodiments, the display device 402 can be configured to display a first image on a first set of pixels including the first pixel 504 and the third pixel 510.

Figure 6:
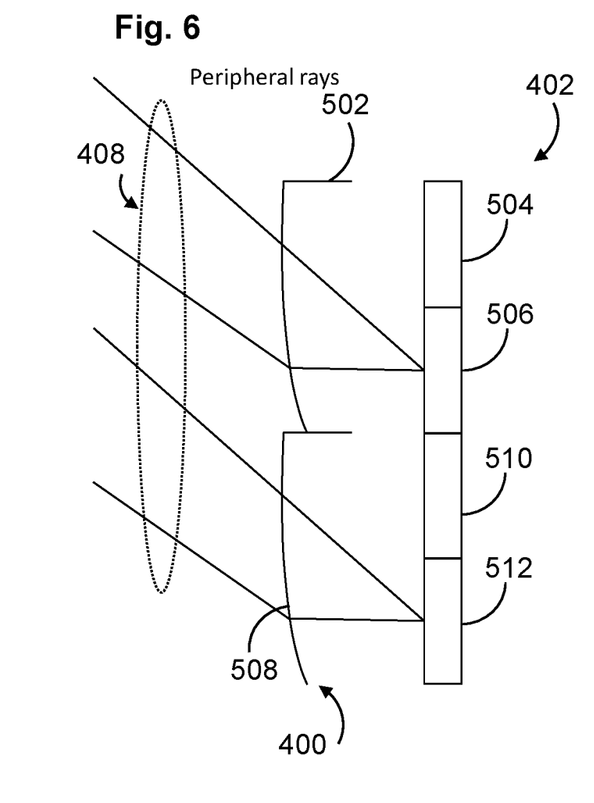
FIG. 6 is a cross-sectional drawing depicting microlenses directing peripheral rays from pixels of a display device according to embodiments of the present invention.

FIG. 6 is a cross-sectional drawing depicting the microlenses 502 and 508 directing peripheral rays from pixels of a display device according to embodiments of the present invention. FIG. 6 shows the peripheral set of rays 408 formed by the microlens array 400. The light from the second pixel 506 and the fourth pixel 512 are directed upwards by the microlens array 400 to form the peripheral set of rays 408. In some embodiments, the display device 402 can be configured to display a second image on the second set of pixels including the second pixel 506 and the fourth pixel 512.

Figure 7:
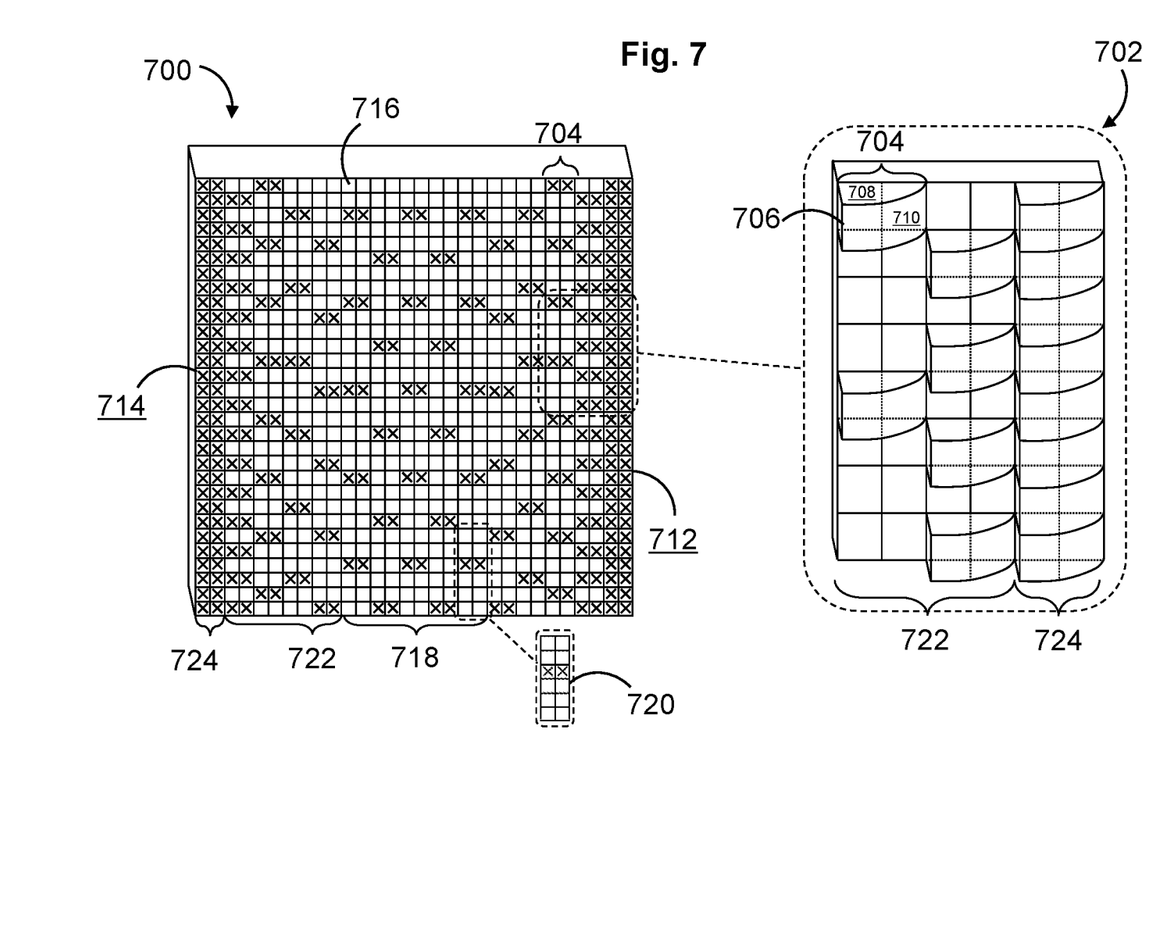
FIG. 7 is a drawing depicting a variable resolution microlens array according to an embodiment of the present invention.

FIG. 7 is a drawing depicting a variable resolution microlens array according to an embodiment of the present invention. The variable resolution microlens array 700 may not cover each pixel of a display device with a microlens. In some embodiments, there may be a pattern of microlenses that cover a percentage of the pixels of a display device. In some embodiments, the microlenses are not arrayed in a regular repeating pattern. One or more of the pattern and density of the array may be spatially varied so that there is variation in angular resolution. The pattern may be determined based on the variable resolution of a human eye.

The mean angular resolution in pixels per degree is fixed, as it is given by the division of the number of pixels along one axis by the FOV along this axis. In some embodiments, the distribution of which pixels are visible in which ranges of viewing angles can be altered to increase the mean perceived resolution. For example, the resolution of the display screen can be matched with the resolution of a lens or of the eye. In some embodiments, the central FOV, associated with the central set of rays, can be characterized by a higher angular resolution and the peripheral FOV, associated with the peripheral set of rays, can be characterized by a lower angular resolution. Such resolution of the central set of rays versus the peripheral set of rays is suitable because it more matches the resolution of the human eye, by which the resolution of sight is greater in the central field than in the peripheral field.

FIG. 7 shows an example microlens array 700 configured to provide a variable angular resolution. FIG. 7 includes an expanded view 702 of a portion of the microlens array 700 illustrating an example variable microlens pattern. Some pairs of pixels 704 are shown as covered by a microlens 706. The example microlens array 700 shows pairs of pixels 704 covered by a microlens with an X. In some embodiments, microlens array 700 may include different pixel and microlens arrangements such as pairs of pixels, pairs of subpixels, or other numbers of subpixels covered by a single microlens. For each pair of pixels 704, a first pixel 708 emits light that is directed by the microlens 706 to a central set of rays that can be seen when looking directly at the screen. In addition, a second pixel 710, of the pair of pixels 704, emits light that is directed by the microlens 706 to a peripheral set of rays that can be seen when looking at the screen from an oblique angle. The variable resolution is illustrated in FIG. 7 by the higher density of pairs of pixels covered by a microlens at the right-hand edge of the screen 712 and the left-hand edge of the screen 714. In some embodiments, light from pairs of pixels 704 covered by a microlens 706 can be evenly split in separate directions.

Pixels not marked by an X 716 can emit light that can be directed to the central set of rays. Light directed to the central set of rays can be seen when viewing the screen from an angle perpendicular to the surface of a display screen. Light from pixels not marked by an X 716 can be directed to the central set of rays using one or more optical elements. The optical elements can include microlenses that cover a single pixel, microlouver films, and collimators configured to collimate light from a backlight. The concentration of microlenses in the center of the array can be based on the natural focus and resolution of the eye of a user. In some embodiments, a variable resolution microlens array 700 can include a central region 718 where $1/12^{th}$ of the light emitted by a display screen can be directed to the peripheral set of rays and is visible when viewing the screen at an oblique angle and $11/12^{th}$ of the light emitted is directed to the central set of rays and can be visible when viewing at a perpendicular angle. In the central region 718, a group of twelve pixels 720 includes two pixels covered by a microlens and ten pixels that direct light to the central set of rays. The microlens can direct light from one pixel to the central set of rays and light from a second pixel to the peripheral set of rays.

The microlens array 700 can include one or more transition regions 722 and one or more peripheral regions 724. The number of pixels per group directed to the periphery may increase as the pixels are farther from the center of the microlens array 700. The number of pixels per group directed to the central set of rays and the peripheral set of rays can be determined based on a corresponding resolution of the eye of a user. The one or more peripheral regions 724 can include groups of pixels entirely covered by microlenses. A pair of pixels in the peripheral regions 724 can have light from a first pixel directed to the central set of rays and light from a second pixel directed to the peripheral set of rays.

Figure 8:
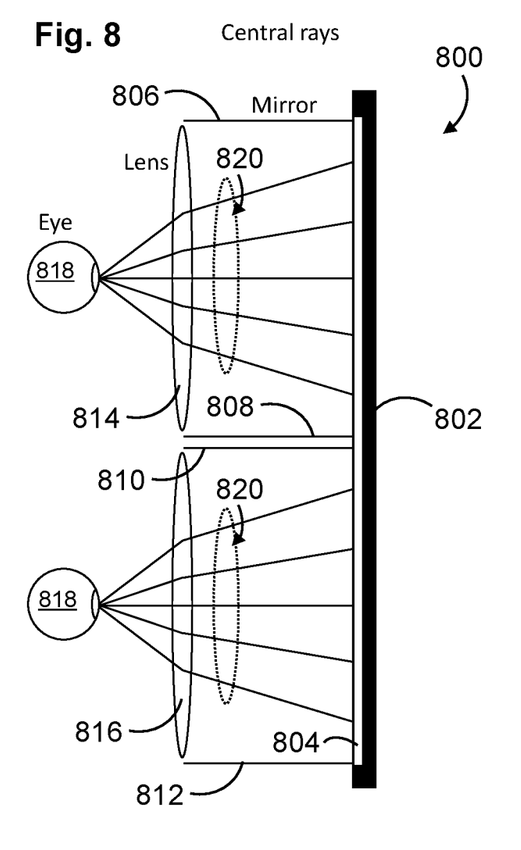
FIG. 8 is a drawing depicting the directing of central rays of a panoramic display in an HMD according to an embodiment of the present invention.
Figure 9:
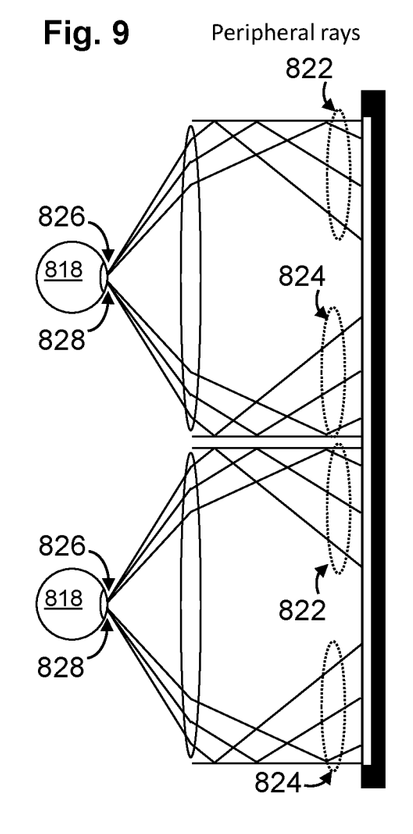
FIG. 9 is a drawing depicting the directing of peripheral rays of a panoramic display in an HMD according to an embodiment of the present invention.

FIG. 8 is a drawing depicting the directing of central rays of a panoramic display in an HMD according to an embodiment of the present invention. HMD 800 includes a display screen 802, a microlens array 804 coupled to the display screen 802, a first mirror 806, a second mirror 808, a third mirror 810, a fourth mirror 812, a first lens 814, and a second lens 816. The HMD 800 directs light from the display screen 802 from multiple positions to the eyes 818 in a single position. In some embodiments, the HMD 800 can be configured to direct light from half of the pixels to a central set of rays 820 that can be seen when the eyes 818 look directly at the screen. As depicted in FIG. 9, the HMD 800 can be configured to direct light from the other half of the pixels to a peripheral set of rays 822 that can be seen when the eyes 818 look at the mirrors in the HMD 800.

HMD 800 can include one lens and two mirrors per eye. For example, when the eyes 818 of a user look forward, slightly left, or slightly right, the user will be looking directly at light from the central set of rays 820 associated with approximately half the pixels. When the eyes 818 of a user look far to the left, the user will be looking at the first mirror 806 and the third mirror 810. The mirrors can reflect a left set of peripheral rays 822 toward the eyes 818 of a user to form one or more peripheral image points 826. In some embodiments, the left set of peripheral rays 822 reflected from the first mirror 806 and the third mirror 810 include light from a quarter of the pixels. When the eyes 818 of a user look far to the right, the user will be looking at the second mirror 808 and the fourth mirror 812. The mirrors can reflect a right set of peripheral rays 824 toward the eyes 818 of a user to form one or more peripheral image points 828. In some embodiments, the right set of peripheral rays 824 reflected from the second mirror 808 and the fourth mirror 812 include light from a last quarter of the pixels.

The system in HMD 800 can be designed so that all the pixels are visible for different eye rotations without visible seams. The first lens 814 and the second lens 816 can be designed to correct for aberrations caused by the central rays and peripheral rays travelling different paths to the eyes 818 of a user. Additionally, the apparent intensity of individual pixels can be adjusted based on the different optical paths. In some embodiments, the display screen 802 can include two smaller displays for each eye of a user. The system in HMD 800 leaves the user unaware which parts of the image have been reflected from the mirrors. The system in HMD 800 displays an image to a user so the image appears as if the user is looking through a lens at a larger screen. The system depicted in FIGS. 8 and 9 provides HMDs with a panoramic display using a smaller screen for a given FOV as compared to conventional techniques. In some embodiments, the system in HMD 800 provides an immersive display when the distance between the eye and the lens is short compared to the focal length of the lens. Thus, the short distance between the eye and the lens enabled by the panoramic display depicted in FIGS. 8 and 9 permits the HMD 800 to be smaller than conventional HMDs.

Figure 10:
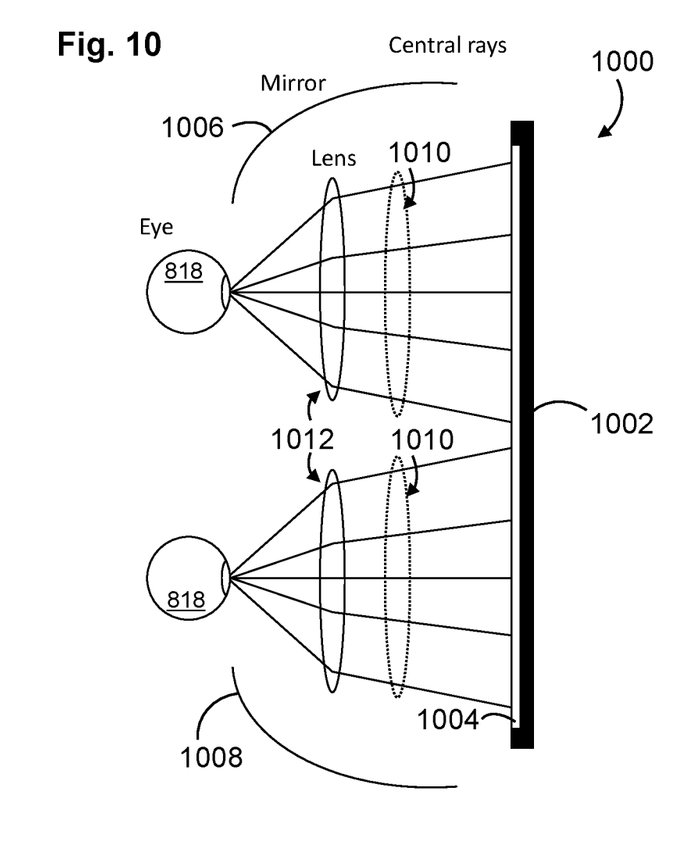
FIG. 10 is a drawing depicting the directing of central rays according to an embodiment of the present invention.
Figure 11:
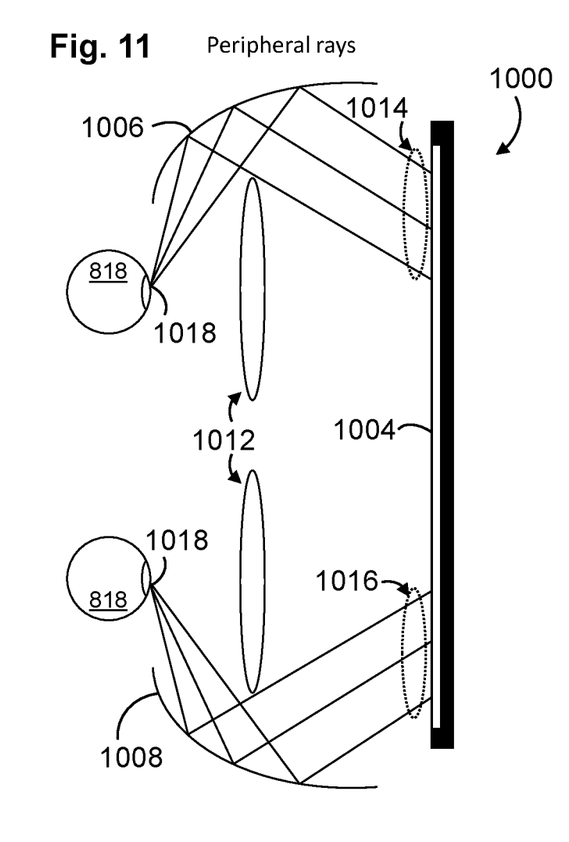
FIG. 11 is a drawing depicting the directing of peripheral rays according to an embodiment of the present invention.

FIGS. 10 and 11 depict another embodiment of the present invention. FIG. 10 is a drawing depicting the directing of central rays according to an embodiment of the present invention. The system in HMD 1000 builds on the previous embodiments and includes a display screen 1002 and a microlens array 1004 coupled to the display screen 1002. The microlens array 1004 directs a central set of rays 1010 to the eyes 818. A pair of lenses 1012 can be configured to focus the central set of rays 1010 at a central image point on the eyes 818. The pair of lenses 1012 can be reduced in diameter as compared to the previous embodiment with the use of a first concave mirror 1006 and a second concave mirror 1008 in the system in HMD 1000.

FIG. 11 is a drawing depicting the directing of peripheral rays according to an embodiment of the present invention. The concave mirrors in HMD 1000 can be configured to reflect the peripheral rays from the display screen 1002 to one or more peripheral image points 1018 at the eyes 818. The microlens array 1004 can be configured to direct a first set of peripheral rays 1014 towards the first concave mirror 1006 and a second set of peripheral rays 1016 towards the second concave mirror 1008. The first set of peripheral rays 1014 and the second set of peripheral rays 1016 can be directed around the pair of lenses 1012 and reflected toward the eyes 818 by the pair of concave mirrors. Because the peripheral rays are reflected around the pair of lenses 1012, the lenses in the system in HMD 1000 can then be reduced in diameter when compared to the lenses used in conventional techniques. In some embodiments, each lens of the pair of lenses 1012 can be 50-65 mm across. The reduced lens size can reduce optical aberrations in the system. In particular, chromatic aberrations which are normally significant in the peripheral FOV of an HMD can be removed in this region. In some embodiments, the mirrors may be positioned closer or further from the screen than the lens is to adjust the FOV. In some embodiments, the mirrors can be configured (e.g. surface properties, geometry) to vary the angular resolution.

Figure 12:
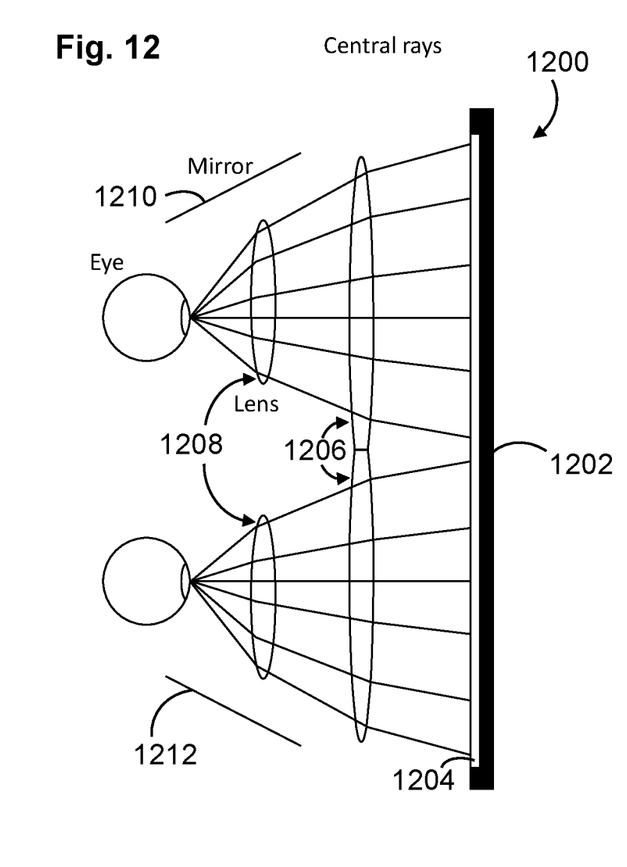
FIG. 12 is a drawing depicting the directing of central rays according to an embodiment of the present invention.
Figure 13:
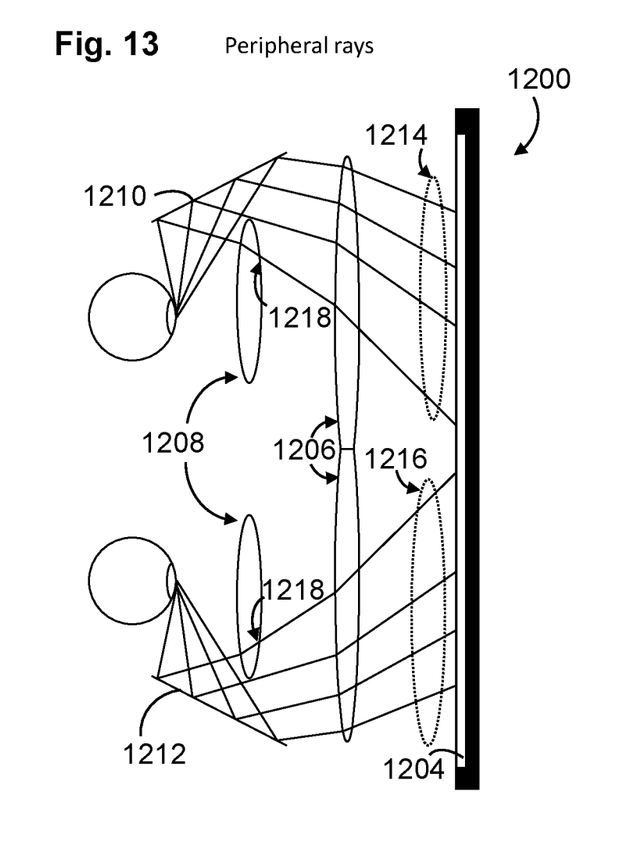
FIG. 13 is a drawing depicting the directing of peripheral rays according to an embodiment of the present invention.

FIGS. 12 and 13 depict another embodiment of the present invention that uses two pairs of lenses to enable direct viewing of the screen. FIG. 12 is a drawing depicting the directing of central rays according to an embodiment of the present invention. The system in HMD 1200 includes a display screen 1202, a microlens array 1204 coupled to the display screen 1202, a first pair of lenses 1206, a second pair of lenses 1208, a first mirror 1210, and a second mirror 1212. The lenses may be made of different materials to reduce aberrations, including transverse chromatic aberration.

FIG. 13 is a drawing depicting the peripheral rays according to an embodiment of the present invention. Rays can be refracted by microlenses in the microlens array 1204 such that they travel at an acute angle to the screen in a first set of peripheral rays 1214 and a second set of peripheral rays 1216. The peripheral sets of rays can pass through at least one or more of the first pair of lenses 1206 and the second pair of lenses 1208. In some embodiments, a portion 1218 of the peripheral rays pass through the second pair of lenses 1208. The first set of peripheral rays 1214 can be reflected by the first mirror 1210 and the second set of peripheral rays can be reflected by the second mirror 1212 so that they arrive at a part of the retina corresponding to the periphery of the vision of a user. The mirrors may be entirely flat, slightly curved to correct residual aberrations, or substantially curved to add focusing power.

The mirrors can be positioned so that peripheral rays, reflected from an image at the display screen 1202, cover regions of the FOV of a user that are far out into the periphery. In some embodiments, the system can provide a FOV greater than 180°. In some embodiments, the mirror does not need to be particularly large to achieve a wide FOV, which means the system need not be larger than conventional HMDs, while offering a far greater FOV. In some embodiments, the mirror dimensions can be comparable to the first pair 1206 or second pair 1208 of lenses.

Figure 14:
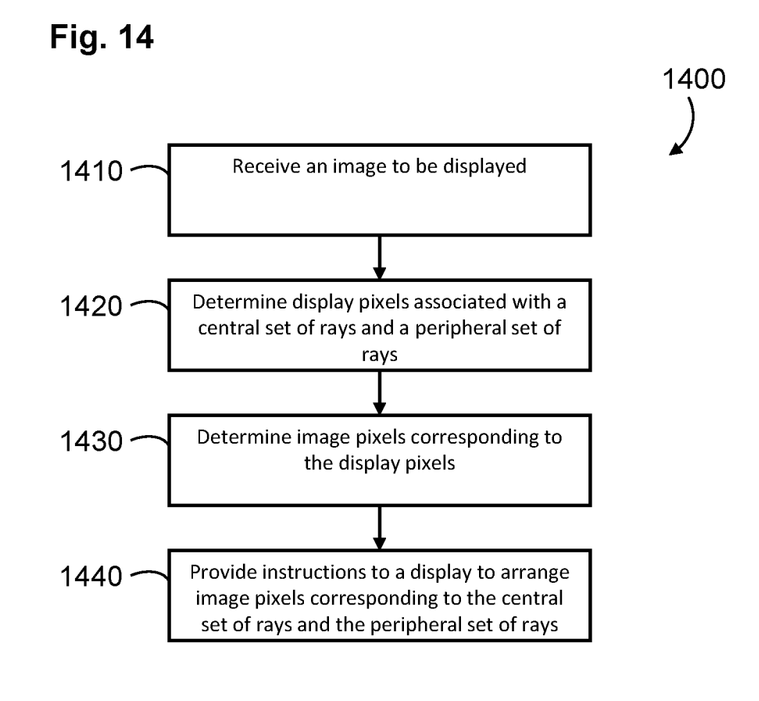
FIG. 14 depicts a process flow to display an image with a first set of pixels corresponding to a central set of rays and a second set of pixels corresponding to a peripheral set of rays according to an embodiment of the present invention.

FIG. 14 depicts a process flow to display an image with a first set of pixels corresponding to a central set of rays and a second set of pixels corresponding to a peripheral set of rays according to an embodiment of the present invention. The process 1400 includes, at step 1410, receiving an image to be displayed. The image can be represented by a plurality of image pixels.

Next, at step 1420, the process 1400 includes determining display pixels associated with a central set of rays and a peripheral set of rays. The central set of rays and the peripheral set of rays can correspond to the rays formed by a microlens array coupled to a display screen of an HMD described herein. In some embodiments, step 1420 can include determining a central set of display pixels associated with the central set of rays and determining a peripheral set of display pixels associated with the peripheral set of rays. In some embodiments, the number of pixels in the central set of display pixels can be greater than the number of pixels in the peripheral set of display pixels.

At step 1430, the process 1400 includes determining a first set of image pixels from the plurality of image pixels corresponding to the central set of display pixels and determining a second set of image pixels from the plurality of image pixels corresponding to the peripheral set of display pixels. The first set of image pixels can be associated with the central set of rays and the second set of image pixels can be associated with the peripheral set of rays. At step 1440, the process 1400 includes generating instructions to display the first set of image pixels on the central set of display pixels and the second set of image pixels on the peripheral set of display pixels. The instructions can cause one or more display pixels to emit light based on one or more corresponding image pixels.

In some embodiments, the process 1400 can include determining a first angular resolution associated with the central set of rays and determining a second angular resolution associated with the peripheral set of rays. The process 1400 can include updating the instructions to display the first set of image pixels on the central set of display pixels and the second set of image pixels on the peripheral set of display pixels based on the first angular resolution and the second angular resolution. In some embodiments, the first angular resolution can be higher than the second angular resolution. In some embodiments, the process 1400 can include determining a first path associated with the central set of rays and a second path associated with the peripheral set of rays. The process 1400 can include determining a difference between the first path and the second path and updating instructions based on the difference between the first path and the second path.

It should be appreciated that the specific steps illustrated in FIG. 14 provide a particular method of displaying pixels associated with a central set of rays and a peripheral set of rays according to an embodiment of the present invention. Other sequences of steps may also be performed according to alternative embodiments. Moreover, the individual steps illustrated in FIG. 14 may include multiple substeps that may be performed in various sequences as appropriate to the individual step. Furthermore, additional steps may be added or existing steps may be removed depending on the particular applications. One of ordinary skill in the art would recognize many variations, modifications, and alternatives.

An aspect of the invention, therefore, is an enhanced panoramic HMD that employs an improved configuration of optical elements to achieve wider field of view as compared to conventional configurations. In exemplary embodiments, a panoramic display includes a display device; a first optical element, coupled to the display device, configured to direct a central set of rays and a peripheral set of rays; a second optical element, coupled to the first optical element, configured to direct the central set of rays at a central image point; and a third optical component configured to direct the peripheral set of rays to a peripheral image point. The panoramic display may include one or more of the following features, either individually or in combination.

In an exemplary embodiment of the panoramic display, the first optical element comprises a microlens array and wherein the microlens array comprises a plurality of individual microlenses.

In an exemplary embodiment of the panoramic display, an individual microlens of the plurality of individual microlenses is coupled to a first pixel and a second pixel of the display device, wherein light from the first pixel is directed to the central set of rays and light from the second pixel is directed to the peripheral set of rays.

In an exemplary embodiment of the panoramic display, the central set of rays is characterized by a first angular resolution and the peripheral set of rays is characterized by a second angular resolution.

In an exemplary embodiment of the panoramic display, the first angular resolution is greater than the second angular resolution.

In an exemplary embodiment of the panoramic display, the second optical element further is configured to direct one or more rays of the peripheral set of rays at the peripheral image point.

In an exemplary embodiment of the panoramic display, the display device is configured to show a first set of pixels corresponding to the central set of rays and a second set of pixels corresponding to the peripheral set of rays.

In an exemplary embodiment of the panoramic display, the first set of pixels corresponding to the central set of rays includes a greater number of pixels than the second set of pixels corresponding to the peripheral set of rays.

In an exemplary embodiment of the panoramic display, the panoramic display further includes a head mounted device, wherein a field of view visible to a user of the panoramic display is greater than 180°.

In an exemplary embodiment of the panoramic display, the panoramic display further includes a fourth optical element configured to focus the central set of rays at the central image point and a portion of the peripheral set of rays at the peripheral image point.

In an exemplary embodiment of the panoramic display, the third optical component is a mirror configured to reflect the peripheral set of rays to the peripheral image point.

In an exemplary embodiment of the panoramic display, the mirror is characterized by a concave surface.

In an exemplary embodiment of the panoramic display, the panoramic display includes a display device; a microlens array, coupled to the display device, configured to direct a central set of rays and a peripheral set of rays; a first lens configured to focus the central set of rays at a central image point; and a mirror configured to reflect the peripheral set of rays to the first lens, wherein the first lens is further configured to focus the peripheral set of rays to a peripheral image point.

In an exemplary embodiment of the panoramic display, the microlens array is characterized to a variable angular resolution.

In an exemplary embodiment of the panoramic display, the panoramic display further includes a second lens coupled to the first lens, wherein the second lens is configured to focus the central set of rays at the central image point and to focus a portion of the peripheral rays at the peripheral image point.

Another aspect of the invention is a method of displaying an image that can be performed using the enhanced panoramic HMD. In exemplary embodiments, the method includes the steps of: receiving an image represented by a plurality of image pixels; determining a central set of display pixels associated with a central set of rays; determining a peripheral set of display pixels associated with a peripheral set of rays; determining a first set of image pixels from the plurality of image pixels corresponding to the central set of display pixels; determining a second set of image pixels from the plurality of image pixels corresponding to the peripheral set of display pixels; and generating instructions to arrange the first set of image pixels on the central set of display pixels and the second set of image pixels on the peripheral set of display pixels. The method may include one or more of the following features, either individually or in combination.

In an exemplary embodiment of the method of displaying, the method further includes determining a first angular resolution associated with the central set of rays; determining a second angular resolution associated with the peripheral set of rays; and updating the instructions to display the first set of image pixels on the central set of display pixels and the second set of image pixels on the peripheral set of display pixels based on the first angular resolution and the second angular resolution.

In an exemplary embodiment of the method of displaying, the first angular resolution is higher than the second angular resolution.

In an exemplary embodiment of the method of displaying, a number of pixels associated with the central set of display pixels is greater than a second number of pixels associated with the peripheral set of display pixels.

In an exemplary embodiment of the method of displaying, the method further includes determining a first path associated with the central set of rays; determining a second path associated with the peripheral set of rays; determining a difference between the first path and the second path; and updating the instructions to display the first set of image pixels on the central set of display pixels and the second set of image pixels on the peripheral set of display pixels based on the difference between the first path and the second path.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

Embodiments of the present invention are applicable to many display devices in which an enhanced FOV may be desirable, including portable electronic display devices, and including in particular head mounted display devices that may be used in virtual reality (VR) and/or augmented reality (AR) applications.

REFERENCE SIGNS LIST

100—conventional HMD
102—first eye
104—first lens
106—display
108—second eye
110—second lens
114—two images
116—light
200—HMD
204—larger first lens
206—first display
210—larger second lens
212—second display
300—HMD
302—third screen
304—third lens
306—fourth lens
400—microlens array
402—display device
404—central set of rays
406—central field
408—peripheral set of rays
410—far field
502—first microlens
504—first pixel
506—second pixel
508—second microlens
510—third pixel
512—fourth pixel
514—microlens aperture width
516—pixel width
518—optical center
520—pixel center
700—microlens array
702—expanded view of microlens array
704—pair of pixels
706—microlens
708—first pixel
710—second pixel
712—right-hand edge of the screen
714—left-hand edge of the screen
718—central region
720—group of twelve pixels
722—transition regions
724—peripheral regions
800—HMD
802—display screen
804—microlens array
806—first mirror
808—second mirror
810—third mirror
812—fourth mirror
814—first lens
816—second lens
818—eyes
820—central set of rays
822—left peripheral set of rays
824—right set of peripheral rays
826—first peripheral image point
828—second peripheral image point
1000—HMD
1002—display screen
1004—microlens array
1006—first concave mirror
1008—second concave mirror
1010—central set of rays
1012—pair of lenses
1014—first set of peripheral rays
1016—second set of peripheral rays
1018—peripheral image points
1200—HMD
1202—display screen
1204—microlens array 1206—first pair of lenses
1208—second pair of lenses
1210—first mirror
1212—second mirror
1214—first set of peripheral rays
1216—second set of peripheral rays
1218—portion of peripheral rays
1400—process to display image
1410—receiving image step
1420—determining display pixels step
1430—determining image pixels step
1440—generating display instructions step

What is claimed is:

1. A panoramic display comprising:
a display device including a first set of pixels and a second set of pixels that is interspersed with the first set of pixels;
a first optical element, coupled to the display device, configured to direct light from the first set of pixels to generate a central set of rays that travel along a central light path, and to direct light from the second set of pixels to generate a peripheral set of rays that travel along a peripheral light path;
a second optical element, coupled to the first optical element, configured to direct the central set of rays to a central image point; and
a third optical component configured to direct the peripheral set of rays to a peripheral image point.

2. The panoramic display of claim 1 wherein the first optical element comprises a microlens array and wherein the microlens array comprises a plurality of individual microlenses.

3. The panoramic display of claim 2 wherein an individual microlens of the plurality of individual microlenses is coupled to a first pixel from the first set of pixels and a second pixel from the second set of pixels of the display device, wherein light from the first pixel is directed to the central set of rays and light from the second pixel is directed to the peripheral set of rays.

4. The panoramic display of claim 1 wherein the central set of rays is characterized by a first angular resolution and the peripheral set of rays is characterized by a second angular resolution.

5. The panoramic display of claim 4 wherein the first angular resolution is greater than the second angular resolution.

6. The panoramic display of claim 1 wherein the second optical element further is configured to direct one or more rays of the peripheral set of rays at the peripheral image point.

7. The panoramic display of claim 1 wherein the display device is configured to show the first set of pixels corresponding to the central set of rays and the second set of pixels corresponding to the peripheral set of rays.

8. The panoramic display of claim 7 wherein the first set of pixels corresponding to the central set of rays includes a greater number of pixels than the second set of pixels corresponding to the peripheral set of rays.

9. The panoramic display of claim 1 further comprising a head mounted device, wherein a field of view visible to a user of the panoramic display is greater than 180°.

10. The panoramic display of claim 1 further comprising a fourth optical element configured to focus the central set of rays at the central image point and a portion of the peripheral set of rays at the peripheral image point.

11. The panoramic display of claim 1, wherein the third optical component is a mirror configured to reflect the peripheral set of rays to the peripheral image point.

12. The panoramic display of claim 11, wherein the mirror is characterized by a concave surface.

13. A method of displaying an image comprising:
receiving an image represented by a plurality of image pixels;
determining a central set of display pixels associated with a central set of rays;
determining a peripheral set of display pixels associated with a peripheral set of rays;
determining a first set of image pixels from the plurality of image pixels corresponding to the central set of display pixels;
determining a second set of image pixels from the plurality of image pixels corresponding to the peripheral set of display pixels;
generating instructions to arrange the first set of image pixels on the central set of display pixels and the second set of image pixels on the peripheral set of display pixels;
determining a first path associated with the central set of rays;
determining a second path associated with the peripheral set of rays;
determining a difference between the first path and the second path; and
updating the instructions to display the first set of image pixels on the central set of display pixels and the second set of image pixels on the peripheral set of display pixels based on the difference between the first path and the second path.

14. The method of claim 13 further comprising:
determining a first angular resolution associated with the central set of rays;
determining a second angular resolution associated with the peripheral set of rays; and
updating the instructions to display the first set of image pixels on the central set of display pixels and the second set of image pixels on the peripheral set of display pixels based on the first angular resolution and the second angular resolution.

15. The method of claim 14 wherein the first angular resolution is higher than the second angular resolution.

16. The method of claim 13 wherein a number of pixels associated with the central set of display pixels is greater than a second number of pixels associated with the peripheral set of display pixels.

17. A panoramic display comprising:
a display device including a first set of pixels and a second set of pixels that is interspersed with the first set of pixels;
a microlens array, coupled to the display device, configured to direct light from the first set of pixels to generate a central set of rays that travel along a central light path, and to direct light from the second set of pixels to generate a peripheral set of rays that travel along a peripheral light path;
a first lens configured to focus the central set of rays to a central image point; and
a mirror configured to reflect the peripheral set of rays to the first lens, wherein the first lens is further configured to focus the peripheral set of rays to a peripheral image point.

18. The panoramic display of claim 17 wherein the microlens array has a variable angular resolution.

19. The panoramic display of claim 17 further comprising a second lens coupled to the first lens, wherein the second lens is configured to focus the central set of rays at the central image point and to focus a portion of the peripheral rays at the peripheral image point.

* * * * *